April 7, 1953 E. A. DIETZ 2,634,134

RECORD-DISK CENTERING AND CLAMPING MECHANISM

Filed July 27, 1949

INVENTOR
Edward A. Dietz
By Henry Lanahan
ATTORNEY

Patented Apr. 7, 1953 2,634,134

UNITED STATES PATENT OFFICE 2,634,134

RECORD-DISK CENTERING AND CLAMPING MECHANISM

Edward A. Dietz, Westfield, N. J., assignor to Thomas A. Edison, Incorporated, West Orange, N. J., a corporation of New Jersey Application July 27, 1949, Serial No. 106,985

7 Claims. (Cl. 274—9)

This invention relates to a mechanism cooperable with the turntable of a dictating machine for accurately centering the record disc on the turntable and thereupon clamping the record disc thereto.

In dictating machines, ease of installing and removing the records in and from the machine is all-important. Accordingly, in recent dictating machines using records of disc form, the usual upstanding centering pin on the turntable is removed and a slot is provided into which the record disc may be inserted and slid into an approximately centered position on the turntable. For final centering of the record, and for securing the same to the turntable, a clamping ring and centering cone has been provided. When this clamping and centering means is moved axially towards the turntable, the cone first enters the center hole of the disc and moves into a central well of the turntable, to effect the centering operation, and then the clamping ring bears against the annular hub portion of the disc surrounding the center hole to secure the record to the turntable.

Heretofore, the clamping ring and centering cone have been integral. In order though to center accurately with this centering and clamping means, the diameter of the cone where it joins with the clamping ring and the diameter of the center hole of the record disc have had to be held to very accurate dimensions. If the center hole of the disc should be ever so little smaller than the maximum diameter of the cone, then the cone binds with the disc and the clamping ring is prevented from exerting pressure on the disc to hold it flat on the turntable; inversely, if the maximum diameter of the cone is less than the diameter of the center hole of the disc then the cone does not center the disc to the extent of the difference between these two diameters. It is difficult to maintain sufficiently close dimensional limits on these diameters to assure positive clamping while avoiding undesirable eccentricity of the record disc in relation to the turntable such as would preclude positive tracking of the reproducer stylus on the record.

Record discs for dictating machines are now commonly made of thermoplastic material and are recorded on by the embossing or indenting method. Used record discs of this form can now be resurfaced by heating the disc material to a softening temperature while suitably supporting the disc to maintain it flat. When these discs are so heated they undergo dimensional changes. For instance, the disc may shrink or expand to cause the center hole thereof to become smaller or larger, depending upon the conditions of the resurfacing operation. In view of these dimensional changes, it has become highly important that the centering and clamping device be adapted for centering accurately and clamping securely record discs whose center holes have diameters varying within a range such as is encountered in the normal resurfacing the thermoplastic record discs.

My invention is adapted to fulfill these objectives. A general object of the invention is to provide an improved centering-clamping device especially adapted for dictating machines to enable easy mounting and removal of the discs, and accurate centering and positive clamping of the discs to the turntable notwithstanding variations in the diameters of the center holes of the discs.

By my invention the conical centering member of the centering-clamping device is mounted yieldably on the clamping member and has such size that the diameters thereof at its ends are respectively smaller and greater than the range of diameters of the center holes in the discs which are to be encountered in the field. Thus, it is assured that the centering member will always engage the center hole of the disc continuously around its periphery to center accurately the disc notwithstanding variations in the size of the center hole. By having the centering member yieldably mounted on the clamping member, the latter is enabled always to come to bear against the record disc to clamp positively the disc to the turntable.

In the description of my invention reference is had to the accompanying drawings, of which:

Figures 1, 2, 3, 4, 5:
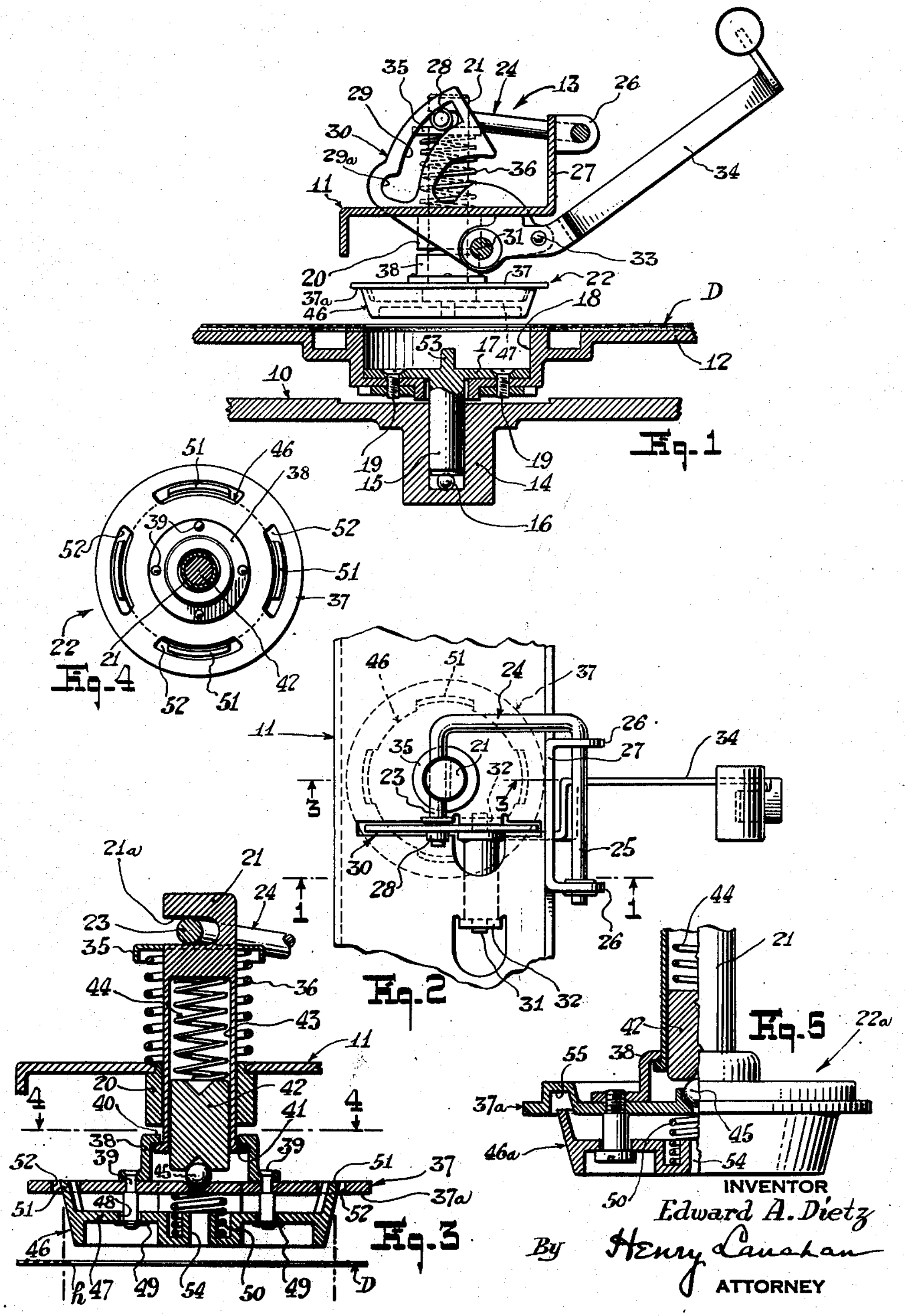
Figure 1 is a fractional view, partially in elevation and partially in section on the line 1—1 of Figure 2, showing a phonograph turntable and record centering and clamping mechanism of which the latter is in accordance with my invention.
Figure 2 is a fractional top plan view of the mechanism of Figure 1.
Figure 3 is a vertical section substantially on the line 3—3 of Figure 2.
Figure 4 is a fractional sectional view taken substantially on the line 4—4 of Figure 3.
Figure 5 is a view, similar to Figure 3 except that the mechanism to one side of the center axis is shown in elevation, showing a modified form of my invention.

In Figures 1 and 2 there is shown fractionally a portion of a phonographic machine comprising main and minor frame sections 10 and 11, a turntable 12 for supporting a record disc D and a clamping mechanism generally referred to as 13 for securing the disc to the turntable. The frame 10 has a bearing 14 for a shaft 15 of the turntable. This is a stub shaft supported on a ball-type thrust bearing 16. The shaft has a flange 17 at the top thereof which forms the bottom wall of a central cylindrical well 18 provided in the turntable, the flange 17 being secured to the turntable by screws 19. The record disc D has a central hole *h* which has a diameter slightly smaller than the diameter of the well 18. This hole and the well 18 receive the clamping mechanism as the same is actuated downwardly towards the turntable, as will hereinafter appear.

The minor frame 11 is supported by the major frame 10 by any suitable means not necessary to show. This frame 11 has thereon a bearing 20 in which a vertical plunger rod 21 is slidably mounted in axial alignment with the turntable. On the lower end of this plunger rod there is a record-disc centering and clamping device 22. My invention is particularly concerned with this device, wherefore the same is hereinafter described in detail.

The plunger rod 21 is provided with a cross slot 21*a* in the upper portion thereof, which is engaged by a cross arm 23 of a U-lever 24. The other arm 25 of this lever is pivoted in apertured lugs 26 turned over from an upstanding standard 27 of the frame 11. On the outer end of the cross arm 23 there is a roller 28 which rides in a cam slot 29 provided in a pivoted metal plate 30. This metal plate is staked to one end of a shaft 31 which is supported by depending apertured lugs 32 struck downwardly from the frame 11. Also staked to the shaft 31, and secured to the plate 30 by a rivet 33, is a hand lever 34 which extends obliquely forwardly to the right of the machine as shown in Figure 1. Interposed between the cross arm 23 and the frame 11, and surrounding the plunger rod 21, are a washer 35 and a compression spring 36. This spring normally holds the plunger rod and hand lever in their raised positions shown in the drawing. Upon pressing the hand lever downwardly, the cam slot 29 moves the cross arm 23 downwardly to depress the plunger rod. At the end of the downward stroke the roller 28 enters into a notch 29*a* in the cam slot to detent the plunger rod and hand lever in their actuated positions. A slight upward exertion on the hand lever from its actuated position will release the detent, whereupon the plunger rod and handle will be propelled upwardly into the positions shown by the spring 36. This actuating mechanism for the plunger rod, together with other detailed features thereof for other purposes not herein necessary to describe, are shown in the pending Dann application Serial No. 780,036, filed October 15, 1947, now Patent No. 2,524,561, issued October 3, 1950, and having a common assignee with the present application. Reference to this Dann application may be had, if desired, as to these further details which do not directly concern the present invention.

The record-disc centering and clamping device 22 is shown in detail in Figures 3 and 4. This device comprises a clamping plate 37, the outer rim portion 37*a* of which may be considered a clamping ring inasmuch as this is the only effective portion of the clamping member. On this clamping plate there is a tubular hub 38 having a bottom flange secured by rivets 39 thereto. This hub is received by the lower portion of the plunger rod 21 and is retained thereon by the abutment of an internal flange 40 on the top part of the hub with an external flange 41 on the bottom part of the plunger rod.

The clamping plate is urged downwardly relative to the plunger rod, into a position defined by the abutment of the flange 40 against the flange 41, by means of a spring-pressed piston 42 slidably mounted in an axial bore 43 of the plunger rod, this piston being urged downwardly by a compression spring 44 between it and the inner end of the bore 43. Between the lower end of the piston and the clamping plate there is a thrust bearing comprising a hardened ball 45 located in axial recesses provided in the plunger and plate (see Figure 3). As the plunger rod is moved downwardly into its actuated position the rim portion 37*a* of the clamping plate engages the annular hub portion of the record disc and the compression spring 44 then yields, causing the plate to exert pressure against the disc to hold it flat on the turntable. As soon as the flanges 40 and 41 are disengaged, in response to the compressing of the spring 44, the ball thrust bearing 45 permits free rotational movement of the clamping plate with the record disc and turntable.

Projecting from the under side of the clamping plate 37 is a record-centering member 46 of a frusto-conical shape. This centering member has an internal web 47 connecting its hub and peripheral portions, which is apertured at 48 to receive downward extensions of the rivets 39. These extensions have collars 49 staked to their lower end portions on which the web is supported. A compression spring 50 interposed between the clamping plate 37 and the hub of the centering member urges the latter downwardly against the collars 49 acting as stops.

The diameter of the centering member in the plane of the lower surface of the clamping plate is made slightly larger than the maximum allowable hole diameter of any record disc, and the diameter of the centering member at its lower end is made small enough to assure entrance of the centering member into the record center hole when the record disc is eccentric on the turntable to the extent permitted by the guide slot aforementioned, say by $\frac{1}{32}$ to $\frac{1}{16}$ inch. Typically, the diameter of the centering member in a plane about three-fourths the operative length thereof from its bottom edge is made equal to the diameter of the center hole of the average record disc. Thus, the centering member is always able to enter the locating hole of the disc and to come into uniform peripheral contact therewith to assure positive centering action irrespective of allowable variations in the size of the center hole of the disc.

The top peripheral portion of the centering member may be broken away at suitable angular intervals about the axis thereof, leaving the centering member for instance with four equally-spaced peripheral sections 51 (Figures 3 and 4). These peripheral sections engage respective clearance openings 52 provided in the clamping plate.

The apertures 48 are made larger than the rivets passing therethrough to provide the centering member with a limited degree of lateral play. Accurate locating of the centering member in coaxial alignment with the turntable is accomplished, as the centering member is moved into effective position, by the engagement of an upright axial pin 53 on the turntable with an axial opening 54 in the hub portion of the centering member, it being understood that one of these elements 53—54 is suitably tapered to assure their engagement within the lateral play limitations of the centering member.

Upon depressing the handle 34 while the record disc is on the turntable and in approximately centered position with respect thereto, the operation is as follows: the plunger rod 21 is cammed downwardly, carrying with it the clamping and centering device 22, and then the plunger rod is latched in its downmost position as hereinbefore described. As the device 22 is so moved downwardly the centering member 46 first enters the center hole of the record disc and the well 18 of the turntable until the centering member comes into continuous peripheral contact with the disc, and simultaneously the pin 53 engages the hole 54 to align the centering member axially with the turntable, all of this being adapted to occur before the clamping plate contacts the disc. After the centering member is stopped by the disc, the spring 50 is compressed as it is made purposely much weaker than the spring 36 which backs the clamping plate. Once, however, the clamping plate abuts against the hub portion of the record disc, the spring 36 is compressed to exert clamping pressure of the plate against the record disc. As this spring 36 is so compressed the two flanges 40 and 41 are separated to leave the device 22 free for rotation on the thrust bearing 45 about the axis of the plunger rod 21.

In Figure 5 there is shown a modified form of the above-described clamping and centering device, which is herein referred to as *22a*. The principal difference in this device over the foregoing is that the centering member 46*a* has a continuous peripheral surface from the top to the bottom thereof and the clamping plate 37 has an annular groove 55 therein to provide clearance for the top portion of the centering member as the latter is moved towards the clamping plate following the stopping of the centering member by the record disc. By providing the centering member with a continuous peripheral surface it has less friction against, and less tendency to cut or wear, the edge of the center locating hole of the disc, with the results that easier action of the mechanism and more accurate centering of the disc are obtained.

The embodiments of my invention hereinabove described are intended to be illustrative and not necessarily limitative of my invention since the same are subject to changes and modifications without departure from the scope of my invention, which I endeavor to express according to the following claims.

I claim:

1. In a phonograph including a turntable provided with a center hole and adapted for supporting a record disc also having a center hole, the diameter of the center hole of said disc being at most not greater than that of the center hole of said turntable: the combination of a record-clamp holder; a record-clamping member movably mounted on said holder and spring-urged relative thereto in the direction towards the turntable, said clamping member having an annular surface for engaging an annular hub portion of the record disc; means for moving said clamping member from the record; a record-centering member carried with said clamping member; means mounting said centering member on said clamping member for limited axial and lateral movement relative thereto, said centering member having a conical surface for engaging the center hole of said disc to center the disc in relation to said turntable as said holder is moved towards the latter, the operative portion of said centering member having maximum and minimum diameters respectively greater and smaller than the diameter of the center hole of said disc; spring means urging said centering member axially with respect to said clamping member into an end position relative thereto and in a direction towards said record support; and means on said centering member and turntable cooperating as said centering member is moved into effective position for axially aligning the centering member with the turntable.

2. In a phonograph including a turntable provided with a central cylindrical well adapted for supporting a record disc having a center locating hole: the combination of a record-clamp holder mounted for movement towards and away from said turntable; a record clamp movably mounted on said holder; stop means on said holder; spring means operatively interposed between said holder and clamp to urge the latter in a direction towards the turntable against said stop means; record-centering means mounted on said clamp for both lateral and axial movement relative to said turntable; stop means on said clamp; spring means urging said centering means in the direction towards said turntable against said last-stated stop means; and means comprising an element on said centering means and a cooperable element on said turntable within said well for locating said centering means at the axis of said turntable as said holder is moved towards the turntable.

3. In a phonograph including a turntable provided with a center hole and adapted for supporting a record disc provided with a center hole, the diameter of the center hole of said record being at most not greater than that of the hole in said turntable: the combination of a record-clamp holder mounted for movement axially towards and away from said turntable; a record-clamping member carried yieldably at the inner end of said holder; a record-centering member projecting from the side of said clamping member facing towards the turntable; means supporting said centering member for movement through a limited range with respect to said clamping member and urging the centering member in the direction of clamping movement of said clamping member, said centering member having a conical surface for engaging the center hole of the disc to center the disc with respect to the turntable, the diameters of said centering member at the ends thereof being respectively smaller and greater than the diameter of the center hole of said disc to enable the centering member, as said holder is moved towards the record disc, to enter the center hole of the disc and engage the edge of the hole uniformly therearound before said clamping member reaches the disc, said clamping member being arranged to clear said centering member as the former is moved onwardly into engagement with the record disc after the centering member is stopped by the disc; and means on said turntable for engaging said centering member and aligning it with respect thereto as the centering member engages the record.

4. In a phonograph including a turntable provided with a central well and adapted for supporting a record disc having a center hole whose diameter is at most not greater than that of said well: the combination of a plunger rod slidably mounted for axial movement in relation to said turntable; a record-clamping plate; means yieldably mounting said clamping plate on said plunger for axial and tilting movement relative thereto; a frusto-conical centering member movably mounted on said clamping plate at the side thereof facing towards the turntable; means urging said centering member with respect to the clamping plate into a maximum extending position relative thereto, the larger and smaller end portions of said centering member having greater and lesser diameters respectively than that of said center hole to cause the centering member to engage said center hole of the disc and to be stopped by the disc before the clamping member reaches the same as said plunger rod is moved towards the turntable; and means for moving said plunger rod towards the turntable to cause said centering member and clamping plate to engage the disc in the sequence here named.

5. The combination set forth in claim 4 wherein said centering member has peripheral sections spaced angularly about the axis thereof, and said clamping plate has openings for clearing it from said peripheral sections as said centering member is moved theretowards.

6. In a phonograph including a turntable provided with a central cylindrical well having therein an axially-positioned locating pin, said turntable being adapted for supporting a record disc having a center hole whose diameter is at most not greater than that of said well: the combination of a plunger mounted for axial movement relative to said turntable; a record-clamping member mounted on said plunger for movement therealong; means defining a limit position of the clamping member on the plunger; axially-positioned means between said plunger and clamping member urging the latter towards the turntable into said limit position and adapted to permit rotational movement of the clamping member relative to the plunger; a frusto-conical record-centering member mounted on said clamping member, at the side thereof facing towards the turntable, for engaging the center hole of the record disc and centering the disc with respect to the turntable as said plunger is pressed downwardly, the mounting for said centering member being adapted to permit both axial and transverse movement of the centering member with respect to said clamping member; means defining a limit position for said centering member in the direction away from the clamping member; resilient means between said clamping member and said centering member urging the latter into its said limit position, said centering member being adapted for peripherally engaging the center hole of said disc before said clamping member reaches said disc, and said mounting means for said centering member being adapted to permit movement of the clamping member relative to the centering member, after the centering member is stopped by the record disc, to allow the clamping member to engage the record disc; and means including an element on said centering member for engaging said locating pin and positioning the centering member at the axis of the turntable as the centering member is moved into effective position.

7. In a device for centering and clamping a record disc to a turntable, said disc having a center hole: the combination of a clamping member mounted for movement into clamping relationship with said turntable to secure said disc to the latter, a centering member projecting from said clamping member and comprising a conical segment having portions nearer and farther from said clamping member which are respectively greater and smaller in diameter than the diameter of the center hole of the record disk whereby the centering member will engage uniformly the edge of the center hole of the disc and be stopped by the disc before the clamping member reaches the same, mounting means on said clamping member for said centering member adapted to permit the clamping member to be pressed onwardly relative to said centering member into clamping engagement with the record disc after the centering member is stopped by the disc, and spring means urging said centering member into said projecting relation with respect to said clamping member, said spring means being adapted to yield after the centering member is stopped by the record disc.

EDWARD A. DIETZ.

REFERENCES CITED

The following references are of record in the file of this patent:

UNITED STATES PATENTS

| Number | Name | Date |
|---|---|---|
| 1,868,846 | Oyston | July 26, 1932 |
| 2,293,219 | Rieber | Aug. 18, 1942 |
| 2,340,418 | Gabel | Feb. 1, 1944 |
| 2,380,727 | Dann | July 31, 1945 |
| 2,518,232 | Giovannucci et al. | Aug. 8, 1950 |

FOREIGN PATENTS

| Number | Country | Date |
|---|---|---|
| 539,492 | Great Britain | Sept. 12, 1941 |